No. 643,370. Patented Feb. 13, 1900.
C. E. BELCHER.
FENDER FOR AUTOMOBILES.
(Application filed Sept. 13, 1899.)

(No Model.) 2 Sheets—Sheet 1.

Witnesses Inventor
C. E. Belcher,
By his Attorneys,

THE NORRIS PETERS CO., PHOTO-LITHO., WASHINGTON, D. C.

No. 643,370. Patented Feb. 13, 1900.
C. E. BELCHER.
FENDER FOR AUTOMOBILES.
(Application filed Sept. 13, 1899.)
(No Model.) 2 Sheets—Sheet 2.
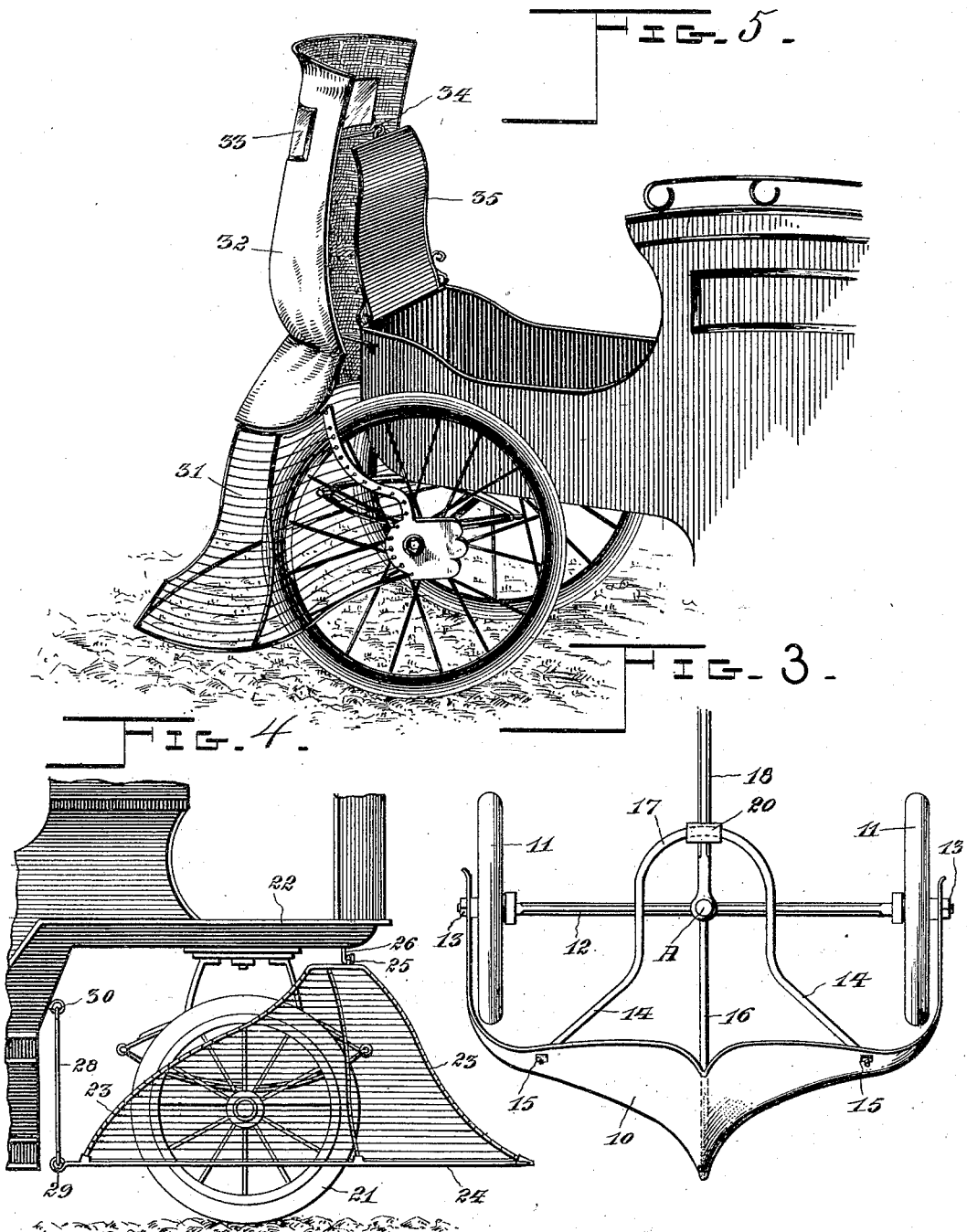
C. E. Belcher, Inventor

UNITED STATES PATENT OFFICE.

CASSIUS E. BELCHER, OF LINDEN, PENNSYLVANIA, ASSIGNOR OF ONE-HALF TO J. HENRY BOWER, OF JERSEY SHORE, PENNSYLVANIA.

FENDER FOR AUTOMOBILES.

SPECIFICATION forming part of Letters Patent No. 643,370, dated February 13, 1900.

Application filed September 13, 1899. Serial No. 730,352. (No model.)

*To all whom it may concern:*

Be it known that I, CASSIUS E. BELCHER, a citizen of the United States, residing at Linden, in the county of Lycoming and State of Pennsylvania, have invented a new and useful Fender for Automobiles, of which the following is a specification.

This invention relates to fenders and wind-guards, and has for its object to equip automobiles or horseless vehicles which are not confined to tracks, but travel at large, with fenders embracing the transversely opposite wheels thereof, protecting the same against collisions and interlocking with the wheels of other vehicles. It is designed to provide fenders for the rear as well as the front wheels of the automobile, if so desired, and said fenders are also designed to protect the propelling mechanism of the vehicle in the event of a collision with another vehicle or with any object.

A further object resides in providing the fender with a wind-guard to shield the occupants of the vehicle against the wind or current of air caused by the rapid movement of the vehicle and also to plow into or separate the air, so as to reduce the friction against the air, and thereby increase the speed of the automobile.

To these ends the present invention consists in the combination and arrangement of parts, as will be hereinafter described, shown in the accompanying drawings, and pointed out in the appended claims, it being understood that changes in the form, proportion, size, and minor details of construction and arrangement may be made within the scope of the appended claims without departing from the spirit or sacrificing any of the advantages of the invention.

Figure 1:
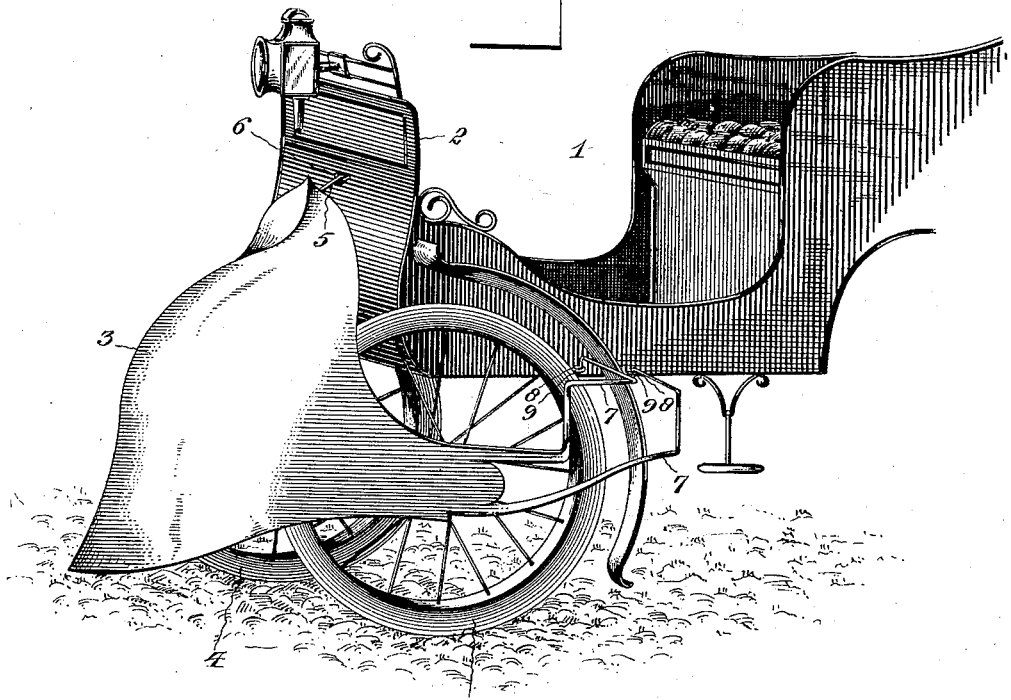
Figure 2:
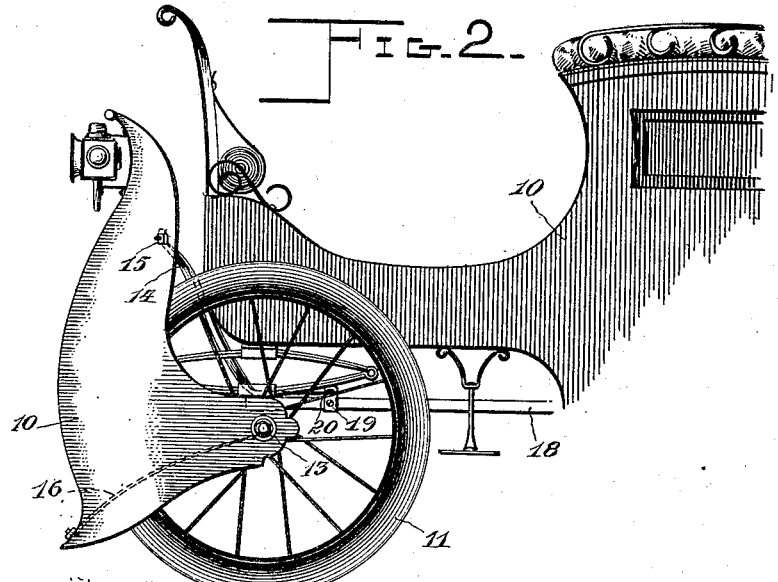

In the accompanying drawings, Figure 1 is a perspective view of the front portion of an automobile equipped with one of the forms of my invention. Fig. 2 is a side elevation showing a modified form of the invention connected to the axle of an automobile. Fig. 3 is a top plan view thereof, the body of the vehicle being removed to more clearly show the connection of the fender with the axle. Fig. 4 is an elevation of a skeleton form of the device applied to a different style of vehicle and mounted entirely independent of the axle. Fig. 5 is a perspective view of the front portion of an automobile and showing a wind-guard provided upon the fender.

Corresponding parts in the several figures of the drawings are designated by like characters of reference.

In carrying out the present invention it will be understood that the fender is to be constructed in several different forms and connected to the vehicle in various ways, some of which have been illustrated in the accompanying drawings and are applicable to the varying types of automobiles. Also as the fender is designed to protect pneumatic or other cushion tires, as well as other parts of the vehicle, said fender has a strong and rigid structure, so as to effectually withstand the shock of collisions.

Referring particularly to Fig. 1 of the drawings, 1 designates an automobile road-cart provided with the usual dashboard 2 and having the simplest form of the invention fitted thereto. This form of the invention comprises a convex imperforate body 3, which extends in advance of the front wheels 4 and embraces the latter. The upper end of the fender projects above the tops of the wheels and is provided at its top with a suitable hook 5, which is detachably engaged with an eye 6, provided upon the front of the dashboard. The opposite sides of the fender are disposed outward from the adjacent wheels, so as not to interfere therewith and permit of the axle being turned laterally within the fender. Extending rearwardly from each side and intermediate of the upper and lower edges thereof is one or more arms 7, which extend beyond the rear sides of the adjacent wheel and are provided with hooks 8 for detachable engagement with suitable eyes 9, provided upon the side of the vehicle-body and in rear of the wheel. Thus it will be seen that the fender is detachably connected to the vehicle and embraces the wheels, so as to prevent injury thereto in the event of a collision and also to protect the propelling mechanism. From the foregoing description it will be understood that the fender is connected to the body only of the vehicle and is independent of the axle and wheels, so that the latter may be turned laterally in guiding the vehicle without engagement with the fender.

In some instances it may be found convenient to mount the fender upon the axle of the vehicle, so that the fender may turn laterally with the axle, and such an arrangement has been illustrated in Figs. 2 and 3. The body 10 of the fender is substantially the same as that shown in Fig. 1 and embraces the wheels 11 in like manner. However, instead of suspending the fender from the upper end thereof it has its opposite sides connected to the adjacent extremities of the axle 12 outside of the hubs of the wheels and held in place by means of nuts or other suitable fastenings 13. By this arrangement it will be seen that the fender is adapted to turn laterally with the axle.

To hold the fender in position upon the axle, there are provided a pair of braces 14, which have their outer extremities passed through the body of the fender at or near the respective upper outer corners and secured thereto by means of nuts 15 or other suitable fastenings. These braces converge rearwardly and downwardly toward the axle and have their rear ends connected by means of a yoke-shaped guide 17. This guide may be integral with the braces or separate therefrom and has its rounded or arched portion located above and in rear of the axle. A suitable clamp 19 is fitted to the reach-bar 18 of the automobile and is provided with a stirrup 20, through which the rounded portion of the yoke-shaped guide 17 loosely passes. It will be noted that the yoke-shaped guide forms an arc of a circle struck from the pivotal point A of the axle as a center, so that said guide may work freely through the stirrup. Another brace-rod 16 extends from a point midway between the ends of the axle to the lower edge of the fender and secured thereto in the same manner as the braces 14. Thus it will be seen that the fender is firmly connected to the axle, and the upper end thereof is braced by means of a movable brace, which permits of the fender moving laterally with the axle.

To accommodate my fender to the cab type of automobile, in which the front wheels 21 are located below the elevated platform 22, upon which the operator's seat is located, I provide a skeleton frame of substantially bell shape, comprising radial bars 23 and marginal rods 24, connecting the lower ends of the radial bars and completing the frame. At the upper end and intermediate of the opposite sides of the frame there is provided an eye 25, which is loosely engaged with a hook 26, pendent from the under side of the platform 22, whereby the fender is suspended from the vehicle and embraces the wheels 21. The rear ends of the opposite sides of the fender extend well in rear of the wheels, and each rear end is suspended from the body of the vehicle by means of a rod or link 28, which is loosely connected at its lower end to the eye 29, provided at the rear end of the frame, and is loosely pendent from an eye 30, provided upon the body of the vehicle. In the cab type of automobile the front wheels are located comparatively close together, and the frame of the fender is large enough to permit of the lateral turning of the axle within the frame, and the latter is loosely swung from the vehicle, so as to permit of a limited movement of the fender, thereby preventing the latter from being injured by light blows.

The rapid movement of an automobile causes a wind or draft of air, which is very disagreeable, especially in cold weather, and to protect the occupants of the vehicle against such a draft of air I have provided a wind-guard, as illustrated in Fig. 5. In this form of the device the fender 31 is preferably of skeleton form, as shown in Fig. 4, and is mounted as described for the forms shown in either of Figs. 1 or 2. The guard 32 is imperforate, extends the entire width of the vehicle, and projects above the dashboard and the heads of the occupants of the vehicle, so as to shield said occupants from the wind. A suitable glass-covered opening 33 is provided near the upper end of the guard, so as to permit of the occupants looking ahead without being exposed to the wind. This guard may be a continuation of the fender or separate therefrom, as desired. If separate, it should rest upon the upper edge of the fender, so as to be firmly supported in position. In either case the upper portion of the guard is braced by a suitable brace-rod 34, which extends from the rear side of the guard to the upper end of the dashboard 35 of the vehicle.

Having thus described the invention, what is claimed, and desired to be secured by Letters Patent, is—

1. The combination with a wheeled vehicle, having a pivotally-mounted axle, of a fender, embracing the opposite wheels of the axle, and carried by the vehicle, substantially as set forth.

2. The combination with a wheeled vehicle, having a pivotally-mounted axle, of a fender embracing opposite wheels of the axle, detachably connected directly to the opposite extremities of the latter, and movable therewith, substantially as set forth.

3. The combination with an automobile, of a fender embracing opposite wheels of the vehicle, and having a connection with the opposite ends of the axle, and braces extending from the axle to the body of the fender, substantially as shown and described.

4. The combination with an automobile, of a fender embracing opposite wheels of the vehicle, and connected to opposite ends of the axle, and braces fixedly connected to the body of the fender, and loosely connected to the vehicle, to permit of lateral movement of the fender, substantially as shown and described.

5. The combination with an automobile, of a fender embracing opposite side wheels of the vehicle, and connected to opposite ends of the axle thereof, braces extending rearwardly from the fender, a yoke-shaped guide connecting the rear ends of the braces, and having a lateral movement upon the vehicle, substantially as and for the purpose set forth.

6. The combination with an automobile, of a fender embracing opposite wheels of the vehicle, and connected to opposite ends of the axle thereof, a brace extending forwardly from the axle to the body of the fender, other braces extending rearwardly from the upper portion of the fender, a substantially yoke-shaped guide connecting the rear ends of the latter braces, and a stirrup mounted upon the vehicle, and loosely supporting the guide, substantially as and for the purpose set forth.

7. The combination with an automobile, of a wheel-fender, and a wind-guard located above the fender and projecting above the heads of the occupants of the vehicle, substantially as and for the purpose set forth.

8. The combination with an automobile, of a fender, and a wind-guard supported upon the upper end of the fender, and projecting above the heads of the occupants of the vehicle, substantially as and for the purpose set forth.

9. The combination with an automobile, of a fender, and a wind-guard located above the fender, and provided with an opening having a transparent covering, substantially as and for the purpose set forth.

In testimony that I claim the foregoing as my own I have hereto affixed my signature in the presence of two witnesses.

CASSIUS E. BELCHER.

Witnesses:
J. L. TURLEY,
A. P. HASKINS.